United States Patent [19]
Sanfilippo et al.

[11] Patent Number: 5,918,616
[45] Date of Patent: Jul. 6, 1999

[54] APPARATUS AND METHOD OF CONTROLLING GAS FLOW

[76] Inventors: James J. Sanfilippo, 505 N. Lake Shore Dr. Suite 6806, Chicago; John E. Sanfilippo, P.O. Box 952, Barrington, both of Ill. 60011

[21] Appl. No.: 08/749,585

[22] Filed: Nov. 15, 1996

[51] Int. Cl.⁶ .................................................. F16K 37/00
[52] U.S. Cl. ........................ 137/1; 137/624.11; 137/884; 137/625.34
[58] Field of Search ...................... 137/597, 360, 137/884, 624.11, 602, 605, 606, 883, 625.34, 1

[56] References Cited

U.S. PATENT DOCUMENTS 4,174,733  11/1979  Eidsmore et al. ................... 137/884 X
5,632,306   5/1997  Taka ..................................... 137/884 X

*Primary Examiner*—Kevin Lee
*Attorney, Agent, or Firm*—Baqniak Nicholas Pine & Gannon

[57] ABSTRACT

Apparatus for controlling gas flow is provided and includes a block having a plurality of distribution channels, and an inlet receiving gas from a source, a plurality of solenoid valves each communicating with the inlet and one of the flow control meters, a plurality of flow control meters each communicating with one of the channels. An opening is formed through the block and is in communication with and transverse to the distribution channels. A spool may be received within the transverse opening to group the channels to provide discrete stepped control of the flow to the outlet. The apparatus is contained in a compact control panel housing which may be mounted adjacent the gassing operation.

20 Claims, 8 Drawing Sheets

APPARATUS AND METHOD OF CONTROLLING GAS FLOW

FIELD OF THE INVENTION

The invention relates to improved apparatus and method for controlling gas flow. More particularly, the invention relates to improved apparatus for throttling a desired gas, for example, controlled environment gas, which includes inert gas, combinations of gases and other aromas, mists, moisture, etc. in discrete steps, and a compact control panel which may be easily mounted in close proximity to the gassing operation, and method of operating the same.

BACKGROUND OF THE INVENTION

Gas control panels are used in a variety of gassing applications, including, for example, the removal of atmosphere from food product and containers, and other atmospheric sensitive products, such as electronics. In the food packaging industry, for example, gassing rails are used for removing the existing atmospheric environment from empty containers, from the product itself as it passes through a hopper, and from the head space of a filled container. Such processes are used, for example, in the packaging of nuts, coffee, powdered milk, cheese puffs, infant formula, beverages and various other types of food product. Typically, food containers are exposed to a controlled environment flush and/or vacuum for a period of time, subsequent to filling but prior to sealing. The product may also be flushed with a controlled environment gas, for example, through gassing elements positioned within a hopper prior to filling, or may be flushed after the filling process. When the atmospheric environment has been substantially removed from the food contents therein, the containers are sealed, with or without vacuum. Gas control panels are used to control and monitor the flow of gas from a source to the gassing rails or other gassing elements.

One problem with existing gas control panels is that they are large and require space in the plant or facility which may not be in close proximity to the gassing operation. Normally a single large panel will be specifically designed to control an entire gassing operation. The location of the panel may necessitate plastic tubes to be run long distances from the panel to the gassing operation, which is both inefficient and inconvenient.

Another problem with existing gassing control panels is that they are pre-engineered for a specific facility and gassing operation. A change in the gassing system layout or the addition of gassing elements or rails may require costly redesign of the control panel.

Another problem associated with existing gassing control panels is that they are designed with tubes within the panel that may be pulled out when the panel is opened by plant personnel.

Another problem with existing gas control panels is that they may have analog control modules which may respond slowly. The analog control is designed to allow plant personnel to adjust the flow of gas continuously throughout its range which may not be necessary for many operations and is typically expensive.

It would be desirable to have a compact control panel that takes up little space and may be mounted at or near the gassing operation. It would also be desirable for the control panel to have the capability of throttling the gas up and down. It would also be desirable for the control panel to not have any tubing inside the panel, to reduce costs, so that it would not be pulled when opening the panel. Moreover, it would be desirable to have added flexibility for grouping of gas distribution circuits.

SUMMARY OF THE INVENTION

One aspect of the invention provides for an apparatus for controlling gas flow including a block, a plurality of solenoid valves, and a plurality of flow meters. The block has a plurality of distribution channels formed therethrough, and an inlet for receiving gas from a source. Each of the solenoid valves communicates with the inlet and one of the flow control meters. Each of the flow control meters communicates with one of the channels. The block has an opening which is in communication with and transverse to the distribution channels. The block may preferably be made of two blocks, a solenoid block which is attached to a distribution block. The apparatus may further include a spool inserted in the transverse opening. The spool has bushings which are designed to seal off groups of channels. The block may further be attached to a control panel housing. A programmable logic controller may be electrically connected to the solenoid valves to allow programmed control of each of the individual channels. The spool may be made of a modular design which includes spacers and sealer bushings which may be combined to create the desired spool. Alternatively, the spool may be formed as an integral member and include a rod and bushings spaced along the rod. The apparatus may further include an exhaust orifice formed through the block and in communication with the solenoid valves.

Another aspect of the invention provides for a method for controlling gas flow. Gas is flowed from a source through an inlet in a block. The gas flows through a plurality of individually metered distribution channels. The flows from the channels are combined through a transverse opening formed through the block and communicating with each of the channels. The combined flow of gas flows through an outlet to the gassing operation. The combined flow may be changed by closing at least one solenoid valve. The combination of channel flow may be controlled by inserting a spool through the transverse opening.

Another aspect of the invention provides an apparatus for controlling gas flow including a gas control panel adapted to mount adjacent to a gassing operation, and a block attached to the panel and including a plurality of individually metered distribution channels, and an inlet for receiving gas from a source. The block has an opening intersecting with and transverse to the channels. The apparatus may preferably have four, six, eight or ten channels. A pressure regulator and filter may preferably be attached to the panel and in communication with the inlet. Preferably, a rod is received in the opening and includes at least one bushing positioned between the intersections of the channels and opening. Plugs may be inserted in the outlet ends of the channels that are not used as outlets to distribute gas to the gassing operation. A safety shut-off solenoid valve may be attached to the panel housing and in communication with the inlet. Preferably the flow to each of the channels is electrically controlled with a solenoid valve. Preferably, each of the distribution chambers may be preset at desired flow levels, for example, in the embodiment shown up to 200 scfh. The flow level may be set at varying levels to achieve desired increments of flow by combining the channels and selectively shutting off access through the solenoid valves in communication with each channel. An electrically controlled gas sensors, for example, oxygen sample transmitter may alternatively be attached to the panel for sampling oxygen levels at various points of gassing operation.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended Claims and equivalents thereof.

DETAILED DESCRIPTION OF THE PRESENTLY PREFERRED EMBODIMENTS

Figure 1:
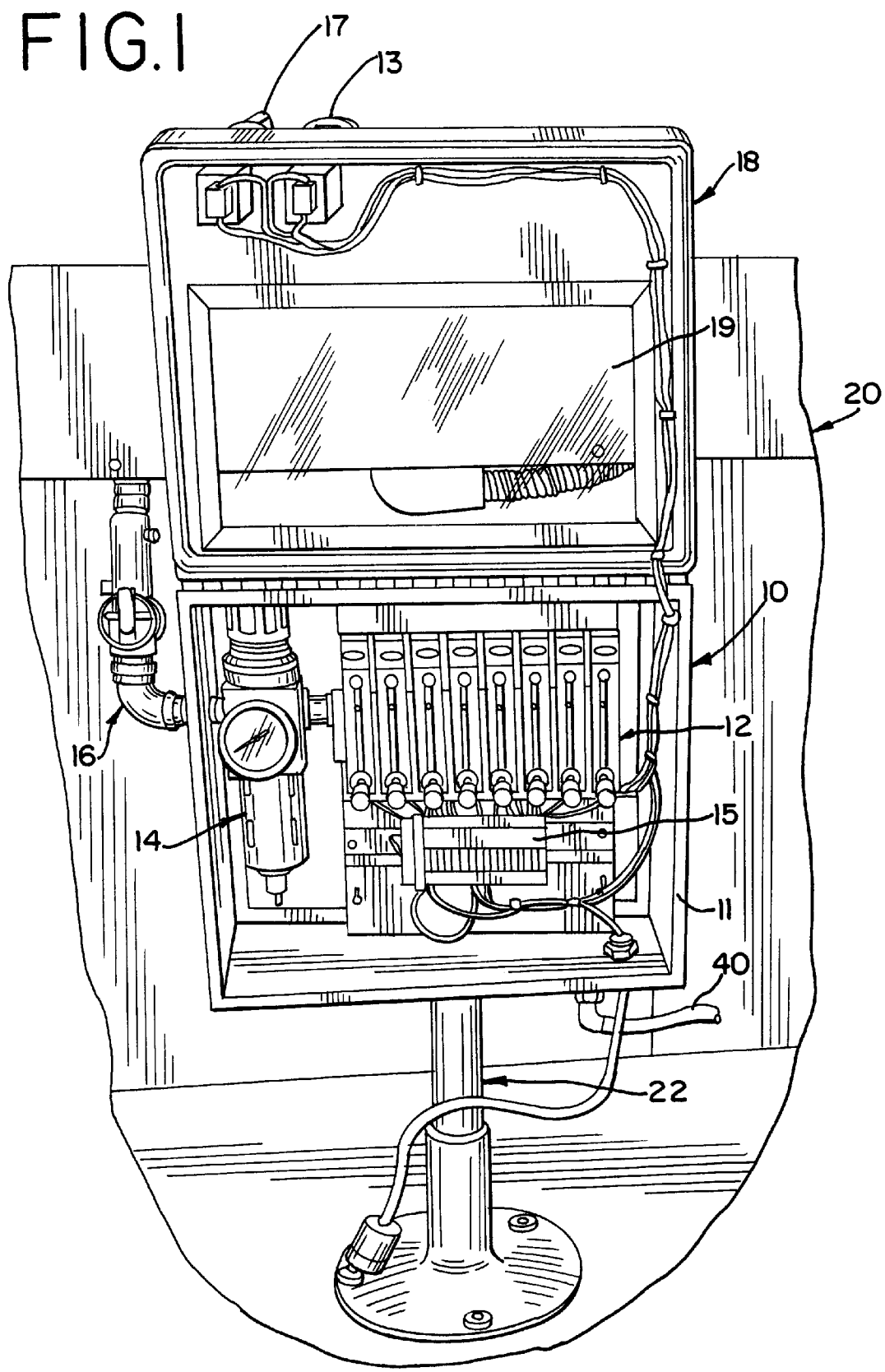
FIG. 1 is a front view of an eight circuit gas control panel embodiment of the invention mounted on a conveyer and gassing rail system support.
Figure 2:
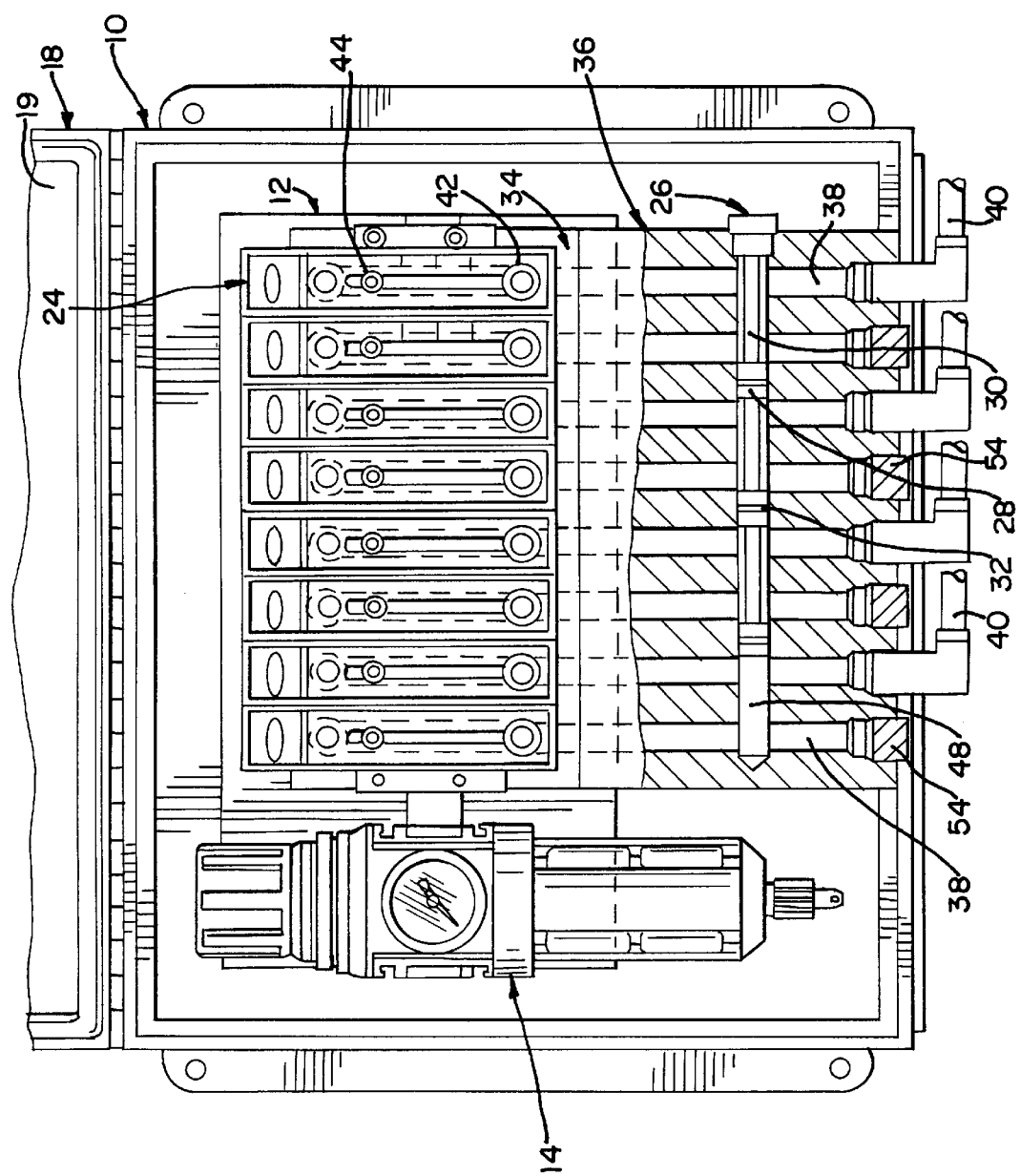
FIG. 2 is a front view of the embodiment of FIG. 1 showing the distribution block in partial section.
Figure 3:
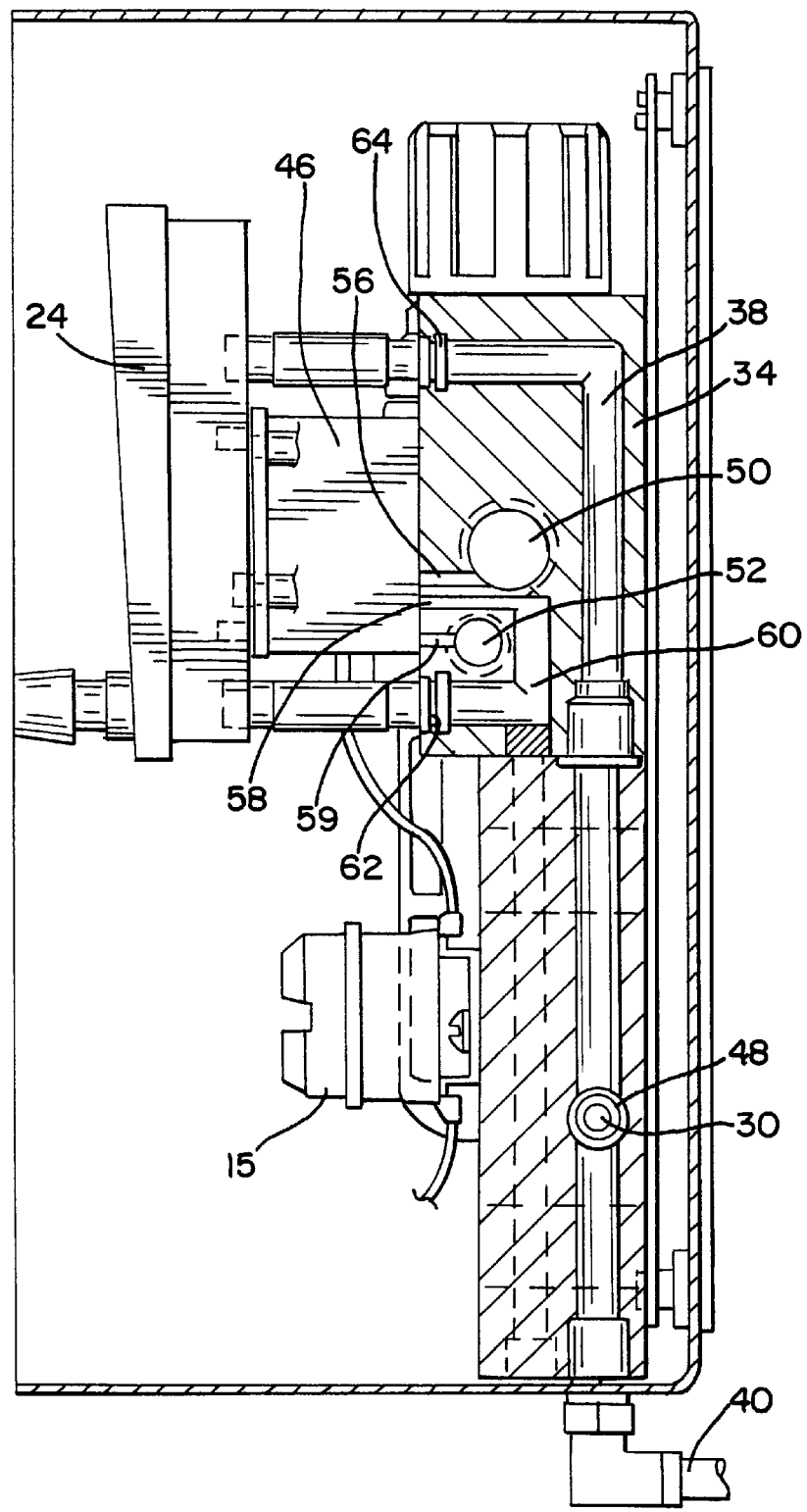
FIG. 3 is a side sectional view of the embodiment of FIG. 1.

Referring to FIGS. 1–3, a gas control panel 10, which includes housing 11 and door 18 with window 19 which is shown hinged to the housing in the open position. For the embodiment shown, for example, the control panel housing 11 is made of rigid material, for example, stainless steel, aluminum or plastic, and has a length of 14.223 inches, a width of 12.281 inches, and a depth of 6.045 inches. The flow controller 12 is mounted in the control panel housing 11 with screws or any other conventional fasteners to facilitate removal and installation. In the embodiment of FIG. 1, the flow controller 12 is connected in series with a filter with pressure regulator 14 which receives gas fed from a source (not shown) through the gas input pipe 16. The flow controller includes a block member, preferably made of a rigid material, for example, stainless steel, plastic, or aluminum with distribution channels 38 formed through the block. In the embodiment shown in FIGS. 1–7, there are two blocks, the solenoid block 34 and the distribution block 36, which are bolted together and sealed appropriately.

Both blocks 34, 36 are made of a rigid material, preferably aluminum or stainless steel. In the embodiment of FIG. 2, the solenoid block 34 has a length of 8.633 inches, a width of 4.0 inches, and a thickness of 2.0 inches, and the distribution block 36 has a length of 8.633 inches, a width of 5.375 inches, and a thickness 1.5 inches. In the embodiment of FIG. 2, the distribution channels 38 have diameters of $7/16$ inch, with their centers aligned 1.062 inches from the top of the distribution block 36, and spaced 0.782 from the ends and 1.01 inches between centers.

In the embodiment shown in FIG. 2, a spool orifice 48, which is transverse to the distribution channels, has a ½ inch diameter and a length sufficient to intersect with each of the channels 38. The spool orifice 48 includes a threaded region near the inlet to receive the threaded region of the spool 26.

Alternatively, the spool 26 may be removed and the spool orifice 48 may be plugged if only one common output is desired. For the embodiment shown in FIG. 2, the spool 26 has a length of 8.096 inches, which includes a 0.25 inch cap portion, and 0.275 inch threaded portion, and is preferably made of aluminum or stainless steel. The rod 30 has a length of 7.221 inches, and a 0.250 diameter. The bushings 28 are spaced to align between the intersections of the channels 38 and spool orifice 48, and have diameters of 0.490 inch, a length of 0.5 inch with a grooved center portion to receive an O-ring 32. The spool 26 is easily replaceable, and is designed to allow, for example, the eight channel flow controller 12, shown in FIG. 2 to be separated into 1 through 8 outlets of gas. As shown in FIG. 2, for example, four outlet channels are provided by positioning the bushings 32 between every two channels 38, and inserting one plug 54 in one of the channels for each isolated channel pair. The hose 40 then may be connected to the unplugged outlet for each isolated pair and connected to, for example, the desired gassing rail or element. For the configuration of FIG. 2, the flow control settings for each of the of the flow meters 24 is set at the maximum of 200 scfh, which will accordingly provide 400 scfh through each of the outlet hoses 40 shown.

Figure 5:
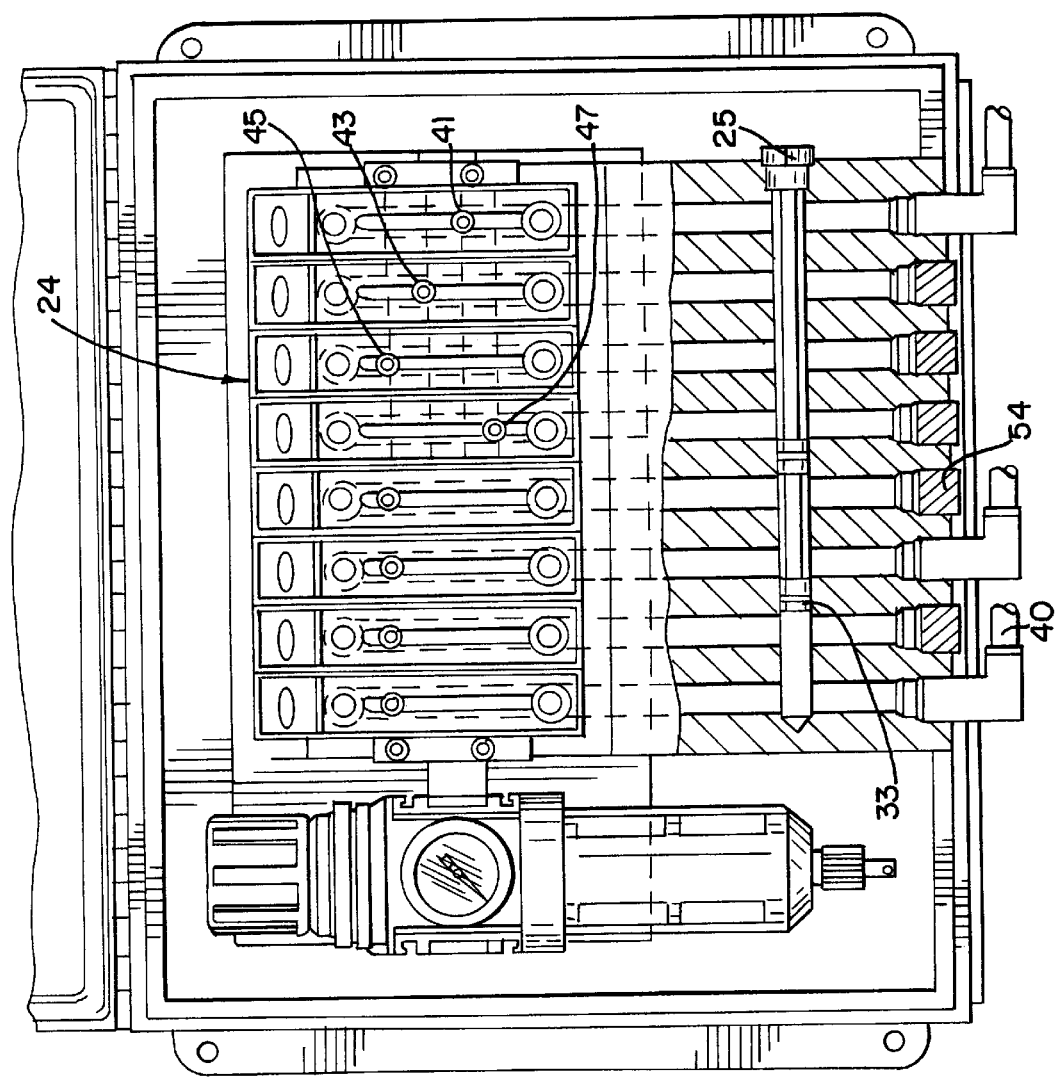
FIG. 5 is a front view in partial section of an alternative configuration of the embodiment of FIG. 2.
Figure 6:
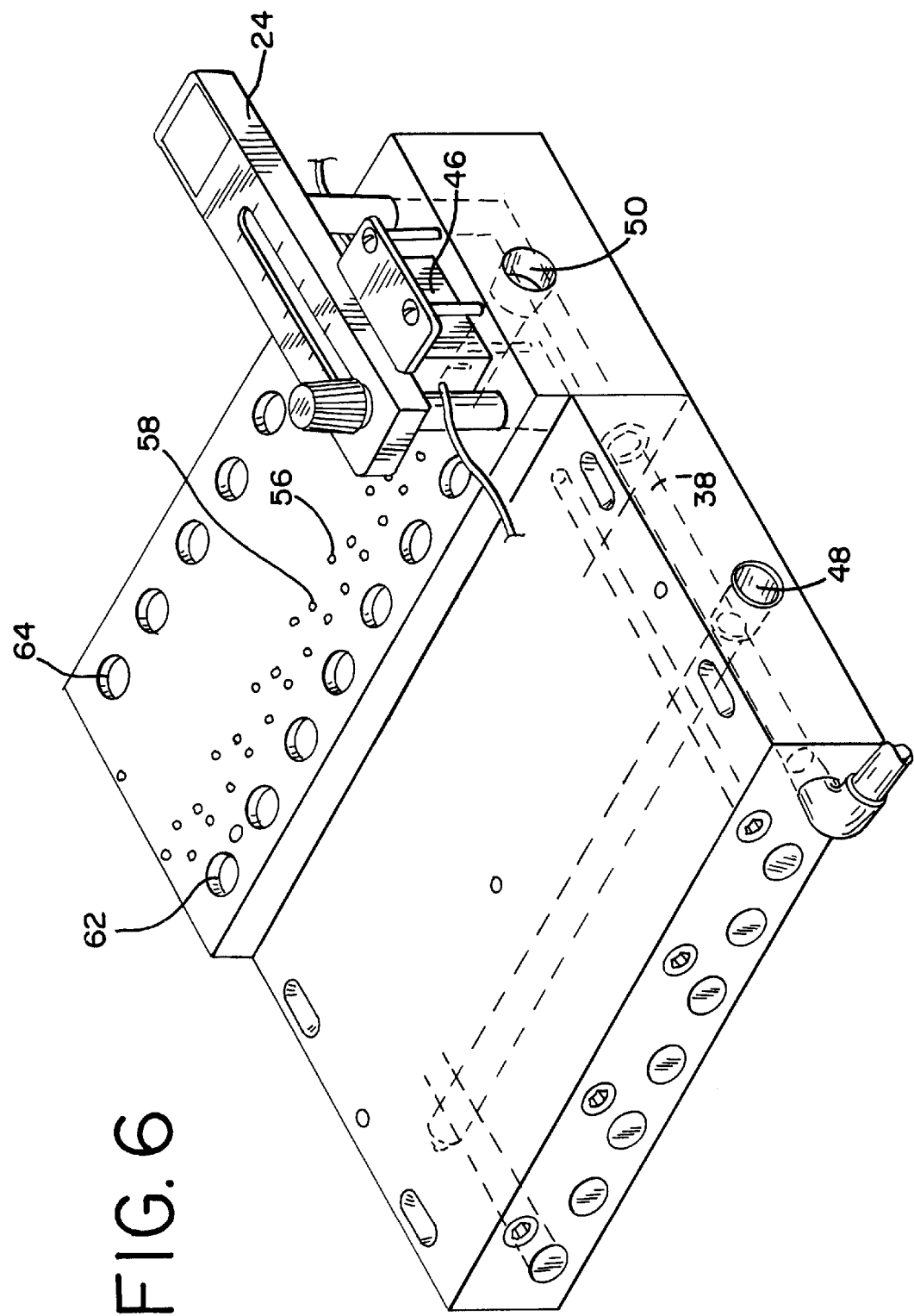
FIG. 6 is a perspective view of an embodiment of flow controller.

In the configuration shown in FIG. 5, for example, the meters 24 are set at different levels including 25 scfh (47), 50 scfh (41), 100 scfh (43), and 200 scfh (45). The two sealer bushings 33 divide the channels to provide one 4-channel grouping and two 2-channel groupings. In the 4-channel grouping a total flow of 375 scfh is provided through the outlet hose 40. Referring to FIG. 6, solenoid valves 46 are electrically connected to the terminal block 15 and may be individually controlled to turn on and off the flow through each of the channels 38. An on-off switch 13 and shut-off button 17 are positioned on the outside of the door 18 may be used to turn on or shut-off all solenoid valves 46 simultaneously. For the 4-channel grouping shown, flows ranging from a maximum of 375 scfh through a minimum of 25 scfh may be achieved without readjusting the flow meter settings by opening or closing the desired channels 38 by control of the solenoid valves. Programmable logic controllers 90 may be used to precisely control the timing for the opening and closing of the valves, and may be mounted inside the control panel or remotely operated. This system provides an advantage over existing analog systems which may operate more slowly.

Figure 7:
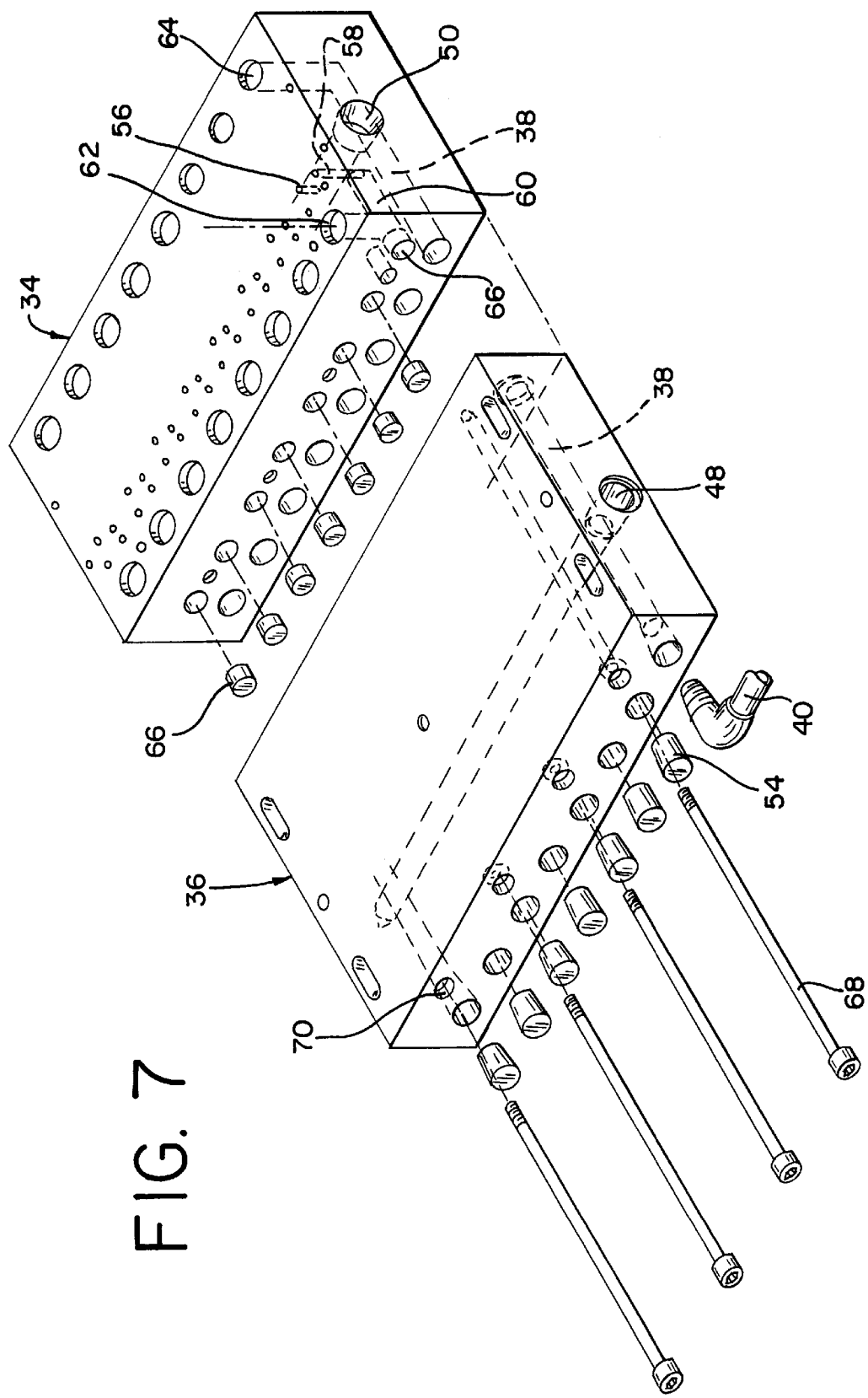
FIG. 7 is an exploded perspective view of the flow controller of FIG. 6.

Referring to FIGS. 3, 6 and 7, the solenoid valves 46 are shown positioned upon the solenoid block 34 and are in communication with solenoid inlet openings 56 and solenoid outlet openings 58. In the embodiment shown, the solenoid inlet openings 56 have a diameter of 0.125 and intersect with the $11/16$ diameter inlet orifice 50. The gas travels through the solenoid valves 46 and through the solenoid outlet openings 58 which intersect with the $5/16$ inch diameter flow meter channel 60 which communicates with flow meter inlet 62. The flow meter channel 60 is closed off with preferably aluminum or stainless steel caps 66. The gas then flows through the 0.495 inch diameter flow meter inlet 62 and through the flow control meter 24 and through the 0.391 inch diameter flow meter outlet 64 to intersect with the $3/8$ inch distribution channel 38. The gas then flows through the solenoid block and through the continuation of distribution channel 38 in the distribution block 36. Bolts 68 are preferably used to connect the blocks 34, 38 through bolt channels 70.

Figure 4:
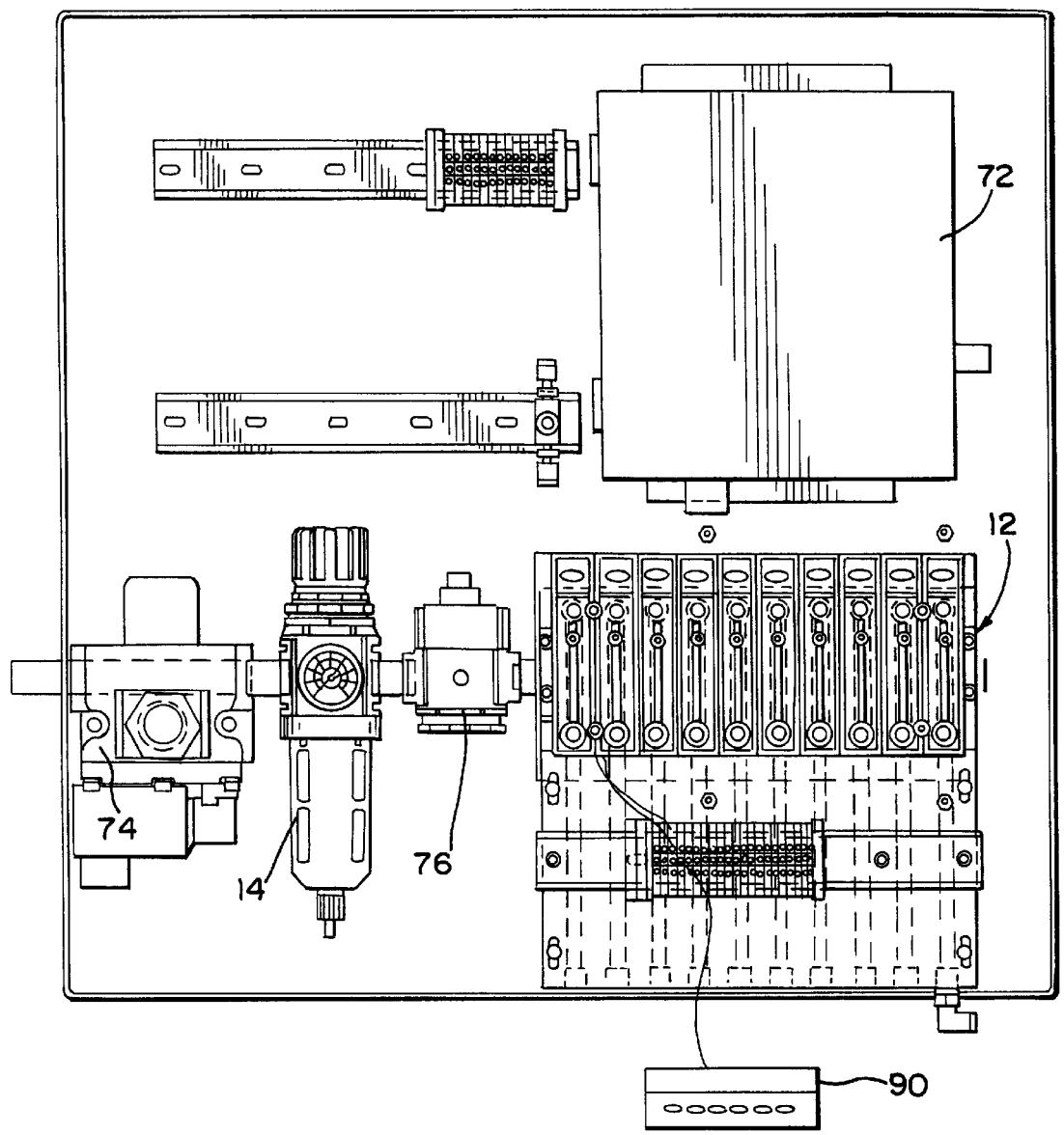
FIG. 4 is an alternative embodiment of a ten circuit gas control panel apparatus of the invention including filter, pressure regulator and solenoid valve.

Referring to FIG. 4, an alternative embodiment may include a safety shut-off solenoid valve 74, mounted to the control panel housing 11. The shut-off valve 74 may be electrically controlled to prevent all flow to the flow controller 12. A pressure control valve regulator 76 may also be mounted to the control panel and connected in series with the flow controller 12, and may be controlled by analog signal. A gas sensor, for example, an oxygen sample transmitter 72 may also be mounted to the panel, and electrically activated to sample oxygen content at the point of gassing the product or container. Based on the level of oxygen, the solenoid valves 46 may be opened or closed to provide an efficient gassing operation. Alternatively, other gas sensors may be used to monitor the concentration of gas, including, for example, $CO_2$ at the point of gassing.

Figure 8:
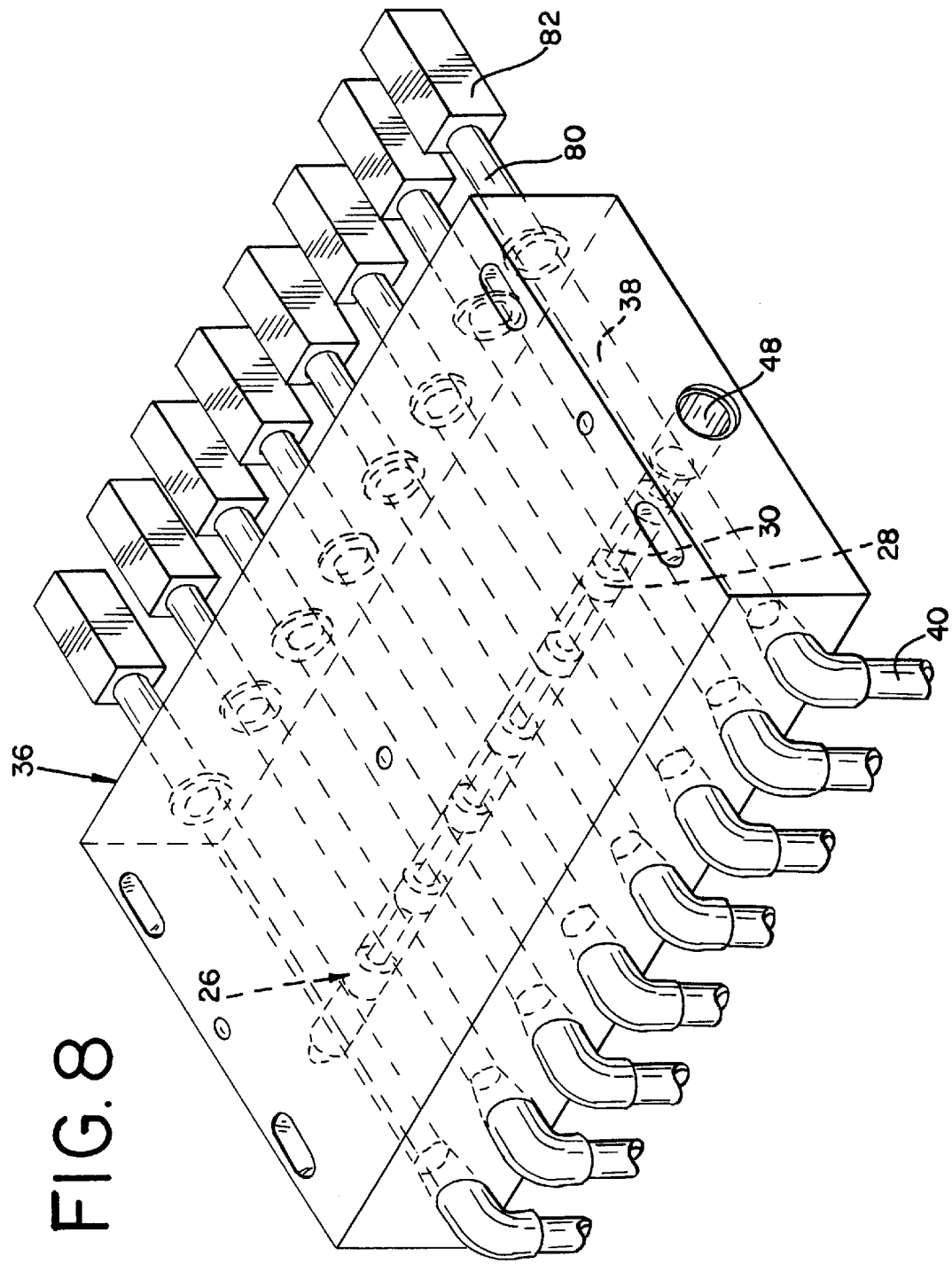
FIG. 8 is a perspective view of an alternative embodiment of an eight circuit flow controller.

Referring to FIG. 8, an alternative embodiment of an eight circuit flow controller including only a distribution block 36 with distribution channels 38 is shown. Infeed tubes 80 from a gas source may be directly connected to each of the distribution channels 38. Alternatively, each infeed tube may receive gas from a separate gas source which may contain, one or more of a variety of different gases including, for example, controlled environment gas, $CO_2$, $N_2$ and $O_2$. The gas entering the distribution block 36, may be individually metered with flow meter 82. The transverse orifice 48 which intersects with each of the distribution channels 38 provides for a uniform and evenly distributed flow between output channels. A spool 26 may be used to separate the distribution channels into various output channels by changing the spool configuration. As shown, eight separate output channels are provided by spacing six bushings 28 between the intersections of the channels and transverse orifice.

In operation, the gas control panel may be mounted in close proximity to the gassing operation. Gas, including, for example, controlled environment gas, $CO_2$, $N_2$, $O_2$, and various blends of gases may be supplied through the inlet hose 16 into the flow controller 12 through the inlet orifice 50. Alternatively, various gases including, for example, controlled environment gas, $CO_2$, $N_2$, $O_2$, may be input through individual distribution channels 38 through infeed tubes 80 which may, if desired, be individually metered with flow meters 82. The individual gases flowing through the channels 38 may then be blended using an appropriate spool configuration which groups the channels to allow cross-flow through the transverse orifice 48 and achieve a desired blended output.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. Apparatus for controlling gas flow comprising:
   a block having a plurality of distribution channels formed therethrough, and an inlet for receiving gas from a source, an opening formed through the block and in communication with and transverse to the distribution channels;
   a plurality of flow control meters, each of the meters communication with one of the channels; and
   a plurality of solenoid valves, each of the valves communicating with the inlet and one of the flow control meters.

2. The apparatus of claim 1 wherein the block comprises a solenoid block attached to a distribution block.

3. The apparatus of claim 1 further comprising a spool inserted in the opening in the block.

4. The apparatus of claim 3 further comprising a control panel housing, the block attached to the housing.

5. The apparatus of claim 1 further comprising a programmable logic controller electrically connected to the solenoid valves.

6. The apparatus of claim 3 wherein the spool comprises modular sealer bushings and spacers.

7. The apparatus of claim 3 wherein the spool comprises a rod and sealer bushing, the rod and sealer bushing are formed as an integral member.

8. The apparatus of claim 1 further comprising a exhaust orifice formed through the block and in communication with the solenoid valves.

9. A method for controlling gas flow comprising:
   providing a block including an inlet and a plurality of distribution channels formed therethrough, a plurality of solenoid valves in communication with the flow meters, a plurality of flow meters for regulating the flow through each channel, and a spool received in an opening formed in the block transverse to and in communication with the distribution channels;
   flowing gas from a source through an inlet in a block;
   flowing the gas from the inlet through a plurality of individually metered distribution channels;
   combining flows from the channels through a transverse opening formed through the block and communicating with each of the channels; and
   flowing each of the combined flows through an outlet.

10. The method of claim 9 further comprising changing the combined flow by closing at least one solenoid valve.

11. The method of claim 9 further comprising controlling the combinations of channel flow with a spool inserted into the transverse opening.

12. Apparatus for controlling gas flow comprising:
   a gas control panel adapted to mount adjacent to a gassing operation;
   a block attached to the panel and including a plurality of individually metered distribution channels, and an inlet for receiving gas from a source; and
   an opening formed in the block and intersecting with and transverse to the channels.

13. The apparatus of claim 12 wherein there are at least eight channels.

14. The apparatus of claim 12 further comprising a pressure regulator and filter attached to the panel and in communication with the inlet.

15. The apparatus of claim 12 further comprising a rod received in said transverse opening and including at least one bushing positioned between the intersections of the channels and transverse opening.

16. The apparatus of claim 12 further comprising at least one plug inserted in an outlet portion of at least one of the channels.

17. The apparatus of claim 15 further comprising a safety shut-off solenoid valve in communication with the inlet.

18. The apparatus of claim 12 wherein the flow through each of the distribution chambers is controlled through a solenoid valve.

19. The apparatus of claim 18 wherein the flow through each of the distribution chambers may be preset at flow levels up to 200 scfh.

20. The apparatus of claim 12 further comprising a gas sensor attached to the panel and electrically controlled.

* * * * *